United States Patent [19]

Bartera

[11] Patent Number: 4,676,225
[45] Date of Patent: Jun. 30, 1987

[54] METHOD AND APPARATUS FOR ENHANCING THE PUMPING ACTION OF A GEYSER PUMPED TUBE

[76] Inventor: Ralph E. Bartera, 4840 Hampton Rd., La Canada, Calif. 91011

[21] Appl. No.: 792,580

[22] Filed: Oct. 29, 1985

Related U.S. Application Data

[63] Continuation of Ser. No. 767,142, Aug. 16, 1985, abandoned.

[51] Int. Cl.$^4$ .................................................. F24J 2/32
[52] U.S. Cl. .................................. 126/433; 126/434; 417/208; 165/104.22
[58] Field of Search ............... 126/433, 417, 434, 435, 126/436; 417/85, 90, 108, 207, 208; 165/45, 485, 104.18, 104.22, 104.24, 104.27, 104.29, 104.22 A

[56] References Cited

U.S. PATENT DOCUMENTS

| | | | |
|---|---|---|---|
| 2,886,746 | 5/1959 | Saby | 165/104.29 X |
| 3,016,833 | 1/1982 | Creed | 417/85 |
| 4,078,149 | 3/1978 | Whirlow et al. | 165/104.29 X |
| 4,224,925 | 9/1980 | Movick | 126/433 X |
| 4,246,890 | 1/1981 | Kraus et al. | 126/433 |
| 4,336,837 | 6/1982 | Koenig | 126/432 X |
| 4,346,693 | 8/1982 | Wagner et al. | 126/434 |
| 4,418,547 | 12/1983 | Clark, Jr. | 165/104.22 X |
| 4,478,211 | 10/1984 | Haines et al. | 165/104.22 A |

Primary Examiner—Larry Jones
Attorney, Agent, or Firm—David O'Reilly

[57] ABSTRACT

A geyser pump and a geyser pumped heat transfer system having a multitude of heat absorbing tubes from which heated liquid is pumped into a vapor/liquid separator by geyser action enhanced by positive vapor bubble generation apparatus and flow control methods. A vapor condenser in communication with the separator recovers heat contained in the vapor bubbles and maintains low separator pressure. Pumping starts and stops in response to temperature differences and the pumping rate is proportional to the heating rate. For bubble generation a small volume of the working fluid is isolated in good thermal contact with the absorbing tube and an aperture is formed in communication between the isolated volume and the main volume of working fluid. The small volume of working fluid can be enclosed by inserting into the geyser pump tube a device in the form of a flanged cylinder or a U-shaped tube. Vapor forms readily in the isolated volume and a vapor±liquid interface at the aperture minimizes superheating in the liquid. A directional flow constriction in the absorbing tube which may be in the form of a check valve improves pumping rates and minimizes oscillations which may be produced by the pulsed flow inherent in a geyser pump system. A flow restriction which may be in the form of an orifice or reduced tube diameter moderates peak flow rates by locally and transiently increasing static pressure in expanding bubbles.

17 Claims, 6 Drawing Figures

METHOD AND APPARATUS FOR ENHANCING THE PUMPING ACTION OF A GEYSER PUMPED TUBE

This application is a continuation of co-pending application Ser. No. 767,142 filed Aug. 16, 1985, now abandoned.

FIELD OF THE INVENTION

This invention relates to self pumped, forced convection heat transfer systems known as geyser pumps, to low superheat vapor bubble generators and to flow control methods for geyser pump tubes.

BACKGROUND OF THE INVENTION

Geyser pumping actions may be used for a variety of devices such as solar heating systems wherein solar thermal energy is transferred from a collector panel to a storage medium as sensible heat in a pumped liquid. One such system is shown and described in U.S. Pat. No. 4,478,211 issued Oct. 23, 1984 which is incorporated herein by reference. The storage medium may be placed any reasonable distance below the top of the geyser pump tubes. This is in contrast with thermosiphon systems which achieve liquid flow by the density difference between hotter and colder regions in the liquid and which require the storage medium to be above the riser tubes. Also, a geyser pumped system eliminates the need for controls, valves, sensors and mechanical pumps such as are required by conventionally pumped heat transfer systems. The geyser pumping action starts and stops automatically in response to the potential for transferring heat and the pumping rate is approximately proportional to the heat transfer rate.

By way of illustration the present invention relates to a solar heat transfer system wherein the pumping action is produced by vapor bubble formation in saturated or slightly superheated liquid in the riser tubes (geyser pump tubes) of a solar collector panel. The vapor bubble formation, expansion and buoyancy cause a gravity imbalance which in turn causes forced circulation of the liquid heat transfer medium through the entire system. After the liquid has been cooled by transferring heat to the storage medium and before it is returned to the riser tubes for reheating, it is used to condense the vapor formed in the riser tubes thereby conserving the energy used to produce the pumping vapor and maintaining the pressure in the system at a suitably low value. The condensation occurs directly on a free surface of the cooled liquid.

A geyser pumped system is generally filled with liquid heat transfer fluid except at the top where the riser tubes enter a vapor filled upper manifold which also serves as a vapor/liquid separator. However, when the storage medium (which is lower in the system) is hotter than the upper manifold, the vapor space appears in the heat exchanger. In the latter condition and with proper configuration of the volumes of the upper manifold and the heat exchanger, a vapor block may be formed in the heat exchanger to prevent reverse pumping and consequent loss of heat from the storage medium One of the problems encountered with geyser pumps relates to the continued, regular generation of vapor bubbles which produce the pumping action. As initially fabricated, the geyser pump system pumps liquid and transfers heat very well for several hours and cycles of operation. However, eventually the regular formation of vapor bubbles in the geyser pump tubes ceases because the natural nucleation sites (where vapor bubbles can readily form) become non-functional. This is a common and widely known phenomenon in nucleate boiling devices and probably occurs because of the depletion of absorbed non-condensable gasses. Without active nucleation sites a vapor bubble cannot form except in the presence of significant superheating. Superheats of 50 to 100 degrees F. above the boiling point are not uncommon and superheats of over 400 degrees F. have been reported. Such high temperatures cause excessive heat loss and reduced efficiency. Also, when the change of state from liquid to vapor occurs in the presence of such superheating, it happens extremely rapidly and a large fraction of the liquid in the tube flashes to vapor. This results in a mixture of vapor and liquid droplets emerging from the top of the riser tubes. Since the function of the geyser pump tubes is to pump liquid, avoidance of excess vapor production through the maintenance of effective bubble formation sites would improve geyser pumping action.

Another problem with geyser pumps relates to the expansion of the vapor bubble in a downward (upstream) direction under some conditions. At high heating rates buoyancy forces are not always adequate to force expansion to occur only in the desired upward (downstream) direction. Reverse expansion dissipates some of the pumping energy, can cause undesirable oscillations and can significantly reduce the liquid pumping rate.

A further problem with geyser pumps relates to possible undesirably high velocities of the liquid emerging from the top of the riser tubes. At high heating rates and with reverse expansion suppressed, the upward expansion of the vapor bubble can be sufficiently rapid as to cause excessive liquid velocities Therefore it is one object of the present invention to provide a heat transfer system which is self pumping and self regulating by a geyser pump action which is enhanced by incorporation of reliable vapor bubble generation means or liquid flow control means or both.

Another object of the present invention is to provide improved pumping action for a geyser pump tube by isolating, within the tube, a small volume of the working fluid in a partially enclosed volume to provide a continuously active site for the generation of vapor bubbles.

Yet another object of the present invention is to provide enhanced pumping action for a geyser pump tube in which the isolated volume is enclosed in such a manner that good thermal contact is provided with the heated surface of the geyser pump tube.

Still another object of the present invention is to provide enhanced pumping action for a geyser pump tube by including a directional flow restriction in the geyser pump tube to prevent oscillations in the pumping action and to direct the expansion forces of the vapor bubble in the desired direction.

Still another object of the present invention is to enhance pumping action of a geyser pump tube by including a flow constriction downstream of the bubble generator, preferably at the top end of the geyser pump tube. Such a constriction moderates the peak liquid flow by causing the pressure in the vapor bubble to increase with the flow rate, thereby reducing the expansion rate.

BRIEF DESCRIPTION OF THE INVENTION

The purpose of the present invention is to provide a reliable and efficient geyser pump and geyser pumped heat transfer system which would include positive bubble generation or flow control methods or both for enhancing the operation of the geyser pump tubes.

A geyser pump system includes one or more vertical or inclined geyser pump tubes which contain liquid heat transfer medium and which are in direct communication with a liquid filled lower manifold and a vapor filled upper manifold. Located in each geyser pump tube at a suitable distance below the liquid surface is a bubble generation means. The liquid is in a state of dynamic equilibrium with its vapor and thus the liquid is at or near its boiling point during heat transfer periods. Heat applied to a geyser pump tube raises the temperature of the liquid contained therein and a vapor bubble grows at the bubble generation means. The bubble expands and rises in the geyser pump tube. A slug of heated liquid is thereby expelled into the upper manifold followed by the vapor bubble. The liquid flows by gravity from the bottom of the upper manifold downward to a heat exchanger means where it is cooled and it then flows upward to a condenser where the vapor is condensed and combined with the liquid. The liquid then flows downward to the lower manifold whence it is returned to the geyser pump tubes.

The bubble generation means may be realized by providing a structure in each geyser pump tube which isolates a relatively small volume of fluid to provide an enclosed vapor forming source. The structure is configured to provide good thermal contact between the isolated volume and the heated surface of the geyser pump tube. An aperture between the isolated volume and the bulk of the liquid provides a vapor/liquid interface for generation of vapor bubbles. The aperture may be of any convenient size that prevents significant natural convective flow between the isolated volume and the bulk of the liquid. In the preferred embodiment a second aperture is provided to facilitate the flow of liquid out of the isolated volume. The optimum position for the structure is dependent upon the particular application.

Heat applied to the geyser pump tube heats the liquid in the full diameter of the tube through, primarily, convection currents established in the bulk of the liquid. At the bubble generating structure in the tube, the heat acts preferentially on the enclosed fluid because convection is effectively suppressed. The rate of temperature rise in the small enclosed volume is therefore higher than in the bulk of the liquid and vapor can form there most easily. A vapor/liquid interface appears at the aperture and forms a ready source for formation of vapor bubbles. As soon as the bulk of the liquid attains the few degrees of superheat necessary for bubble growth, a bubble grows at the aperture, detaches from it and starts to rise in the column of liquid in the tube. Within a short distance the bubble expands to fill the diameter of the tube because it is moving to regions of slightly reduced pressure and slightly higher temperature. The rising and expansion of the bubble pushes liquid ahead of it into the upper manifold which serves as a vapor/liquid separator.

It is important to note that this bubble generating structure is a non-nucleating device and that nucleate boiling is avoided except during initial start up. Thereafter, the enclosed volume always retains some amount of vapor and a vapor/liquid interface.

A geyser pump tube inherently produces intermittent or pulsed flow which can lead to undesirable oscillations in the system and, at high heating rates, the vapor bubble may expand in an upstream (downward) direction causing partially reversed liquid flow. These effects can be avoided by providing a check valve upstream of, or as part of, the bubble generator. A ball type check valve may be incorporated into the bubble generating structure which forms the isolated volume.

At high heating rates sufficient superheat may be available to cause excessively rapid vaporization while the vapor bubble is rising to zones of slightly lower pressure and higher temperature. This leads to unnecessarily high liquid velocities and aggravates oscillations in the system. This problem may be relieved by a flow constriction placed at the top of the geyser pump tube, downstream of the vapor bubble generator. This constriction acts during flow, to increase the pressure between itself and the vapor bubble (and therefore the pressure inside the bubble) generally in proportion to the square of the liquid flow rate. The result is a moderation of each flow pulse by reducing its peak rate and extending its duration. The constriction has no effect between liquid flow pulses.

The above and other features of the invention will be more fully understood from the following detailed description and the accompanying drawings in which:

DETAILED DESCRIPTION OF THE INVENTION

Figure 1:
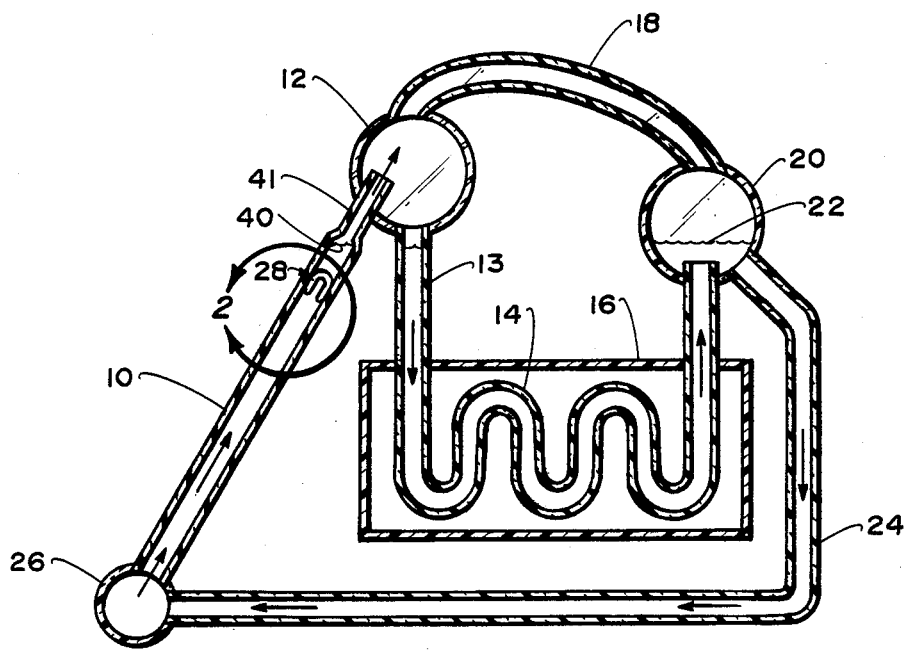
FIG. 1 is an illustration of a solar heating system in semi-schematic form utilizing a bubble generator and flow control means according the invention.

A heat transfer system employing a geyser pump action is shown generally in semi-schematic form in FIG. 1 in which geyser pump tube 10 is heated substantially uniformly from the outside. Geyser pump tube 10 may be part of a solar heating system such as is used herein as an example. Heat is absorbed by the liquid in geyser pump tube 10, a vapor bubble forms at bubble generator 28 and the heated liquid is pumped by a geyser action to separator 12 for circulation through heat exchanger 14 in order to transfer heat to storage tank 16 or other heat receiving means. The cooled liquid then passes to condenser 20. The portion of the fluid which vaporizes in geyser pump tube 10 is transferred via tube 18 to condenser 20 where it is condensed and combined with cooled liquid 22 coming from heat exchanger 14. The combined liquid is returned via supply tube 24 to inlet manifold 26. To provide for reliable, efficient and continued geyser pumping action, bubble generator 28 was developed to consistently produce vapor bubbles and thereby enhance the geyser pumping action. In addition, flow constriction 41 may be used to moderate the expansion of the vapor bubble by increasing the pressure between constriction 41 and the vapor bubble during flow periods.

Figure 2:
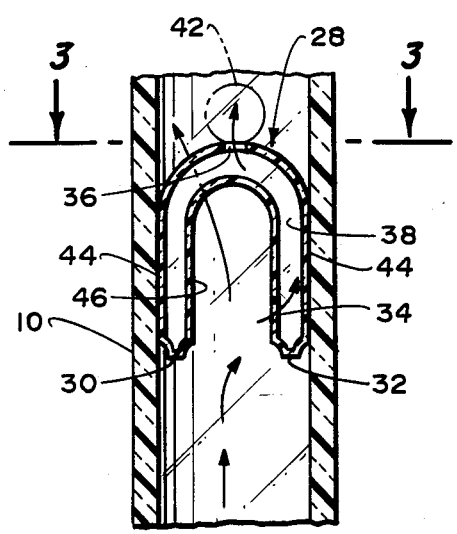
FIG. 2 is an enlarged detailed view of one type of bubble generating device according to the invention.
Figure 3:
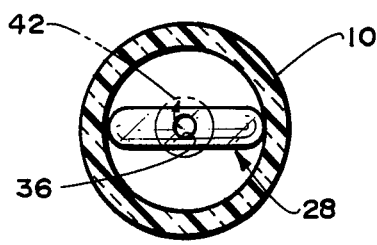
FIG. 3 is a sectional view taken at 3—3 of FIG. 2.

Research and development produced the bent tube bubble generator shown in greater detail in FIGS. 2 and 3. The bent tube configuration was found to be the easiest to fabricate and install in the geyser pump tube 10. Bent tube 28 is formed by closing off the ends of a section of small diameter tubing and bending it into a U-shaped form. Apertures 34 and 36 are drilled into enclosed volume 38. Upper aperture 36 provides a vapor/liquid interface where vapor bubbles can easily form. Lower aperture 34 allows liquid to be easily expelled from the enclosed volume as vapor is formed therein. In some applications a single aperture may be sufficient or one or both ends may be left open. The bent tube provides a small isolated volume of fluid in the interior at 38. The U-shaped configuration is desirable because it acts by a spring like action to hold the device in place and to give good thermal contact with the inside surface of geyser pump tube 10. Bubble generator 28 is placed in geyser pump tube 10 a suitable distance below free surface 40 of working liquid 21 in the tube. This distance depends on the particular application and, in a solar heating application, may be about six to twelve inches. The bubble generating device provides a small isolated volume which is in close thermal contact with the heated wall of the geyser pump tube, which can form and hold vapor and which has one or more apertures 36 to act as bubble generating sites for the geyser pumping action.

As observed in laboratory experiments, the bubble generator maintains some vapor within isolated volume 38 and aperture 36 provides a vapor/liquid interface which prevents the accumulation of large superheats. As soon as the bulk of the liquid in the geyser pump tube reaches the few degrees of superheat necessary for growth of a vapor bubble, a vapor bubble 42 grows from aperture 36. Bubble 42 detaches from the aperture, rises and expands to fill the diameter of the geyser pump tube. A slug of liquid is thereby pushed into separator 12 followed by the vapor bubble. The liquid flows by gravity from the bottom of separator 12 down tube 13 to heat exchanger 14, where it is cooled by transferring heat to storage tank 16, and thence to condensor 20. Vapor in separator 12 flows through tube 18 to condensor 20 where it is condensed on the colder liquid surface. Combined liquid 22 returns through supply tube 24 and manifold 26 to geyser pump tube 10.

The requirements of bubble generator 28 are that it be positioned a suitable distance below free liquid surface 40, that it be in good thermal contact with the heated surface of the geyser pump tube 10 and that isolated volume 38 be small compared to the related volume of liquid in tube 10. Apertures 34 and 36 may be placed anywhere on surface 46 of the device with aperture 34 below aperture 36 to facilitate flow of liquid out of the isolated volume. In applications where the dimensions of the isolated volume are small, capillary forces may predominate over gravitational ones and the relative positions of the apertures would not be especially important.

Figure 4:
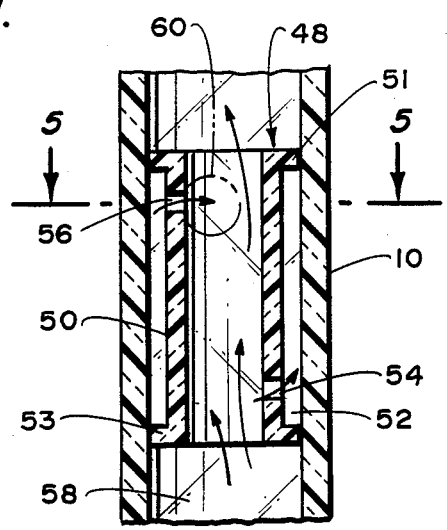
FIG. 4 is an alternate construction of a bubble generating isolating volume structure.
Figure 5:
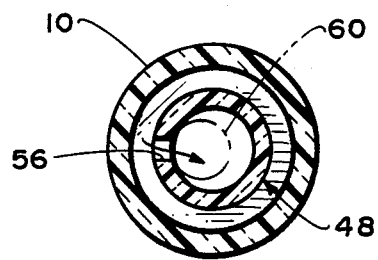
FIG. 5 is a sectional view taken at 5—5 of FIG. 4.
Figure 6:
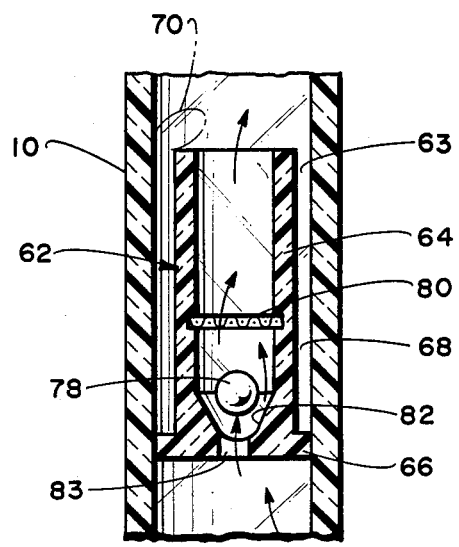
FIG. 6 is an alternate embodiment of the bubble generator of FIG. 4 including a check valve.

An alternate embodiment of the bubble generator can be seen in FIGS. 4 through 6. In FIG. 4 bubble generator 48 is in the form of a hollow cylinder having flanges 51 and 53 which mate with the inside surface of geyser pump tube 10. Cylinder 50 isolates a volume of fluid 52 which is in direct thermal contact with the inside surface of geyser pump tube 10. This configuration facilitates the transfer of heat to isolated volume 52. Aperture 56 provides the vapor/liquid interface and aperture 54 provides the liquid outlet from the isolated volume. In addition, vapor bubbles 60 formed at aperture 56 can more easily detach and rise through geyser pump tube 10. Otherwise this embodiment functions essentially identically with the bent tube embodiment described above. As before the number and location of the apertures may be varied and, in this case, may be incorporated into flanges 51 and 52. In particular, either flange may be replaced by an annular aperture.

An alternate construction of the cylindrical embodiment described above is illustrated in FIG. 6. The upper flange has been removed to provide a single annular aperture 63 for generating vapor bubble 70 by heating liquid in cavity 68. A check valve comprised of ball 78, ball retainer 80 and seat 82 is included in body 64 of bubble generator 62.

At high heating rates, buoyancy forces are not sufficient to cause the vapor bubble to expand only in an upward direction. Downward expansion of the vapor bubble dissipates some of the pumping energy in a non useful reverse direction and also leads to undesirable oscillations in liquid flow. This is especially deleterious where there are several geyser pump tubes working in parallel. An example of several geyser pump tubes working in parallel would be the multiple risers of a solar collector panel. The check valve in the geyser pump tube 10, upstream of or as part of the bubble generator as shown, can prevent reverse flow and oscillations. The check valve can be the ball type shown, a swing flap or any other type that can provide the desired effect. A further advantage of the check valve is that it causes all the bubble expansion force to be directed upward to expel working fluid into separator 12, thereby increasing pumping rates.

While all the bubble generators described above performed quite well in producing pumping vapor bubbles at low and moderate heating rates, increasing the heating rate resulted in irregular geyser pumping action. Apparently, at high heating rates and while the vapor bubbles are rising, sufficient energy is available to cause excessively rapid vaporization and high velocity, short duration flow pulses. A solution to this problem is to place a flow constriction 41 near the top of geyser pump tube 10. Flow constriction 41, which may be a Venturi or another check valve, acts to dynamically increase the pressure between the constriction and the expanding vapor bubble in proportion to the square of the flow rate and is most effective when combined with the check valve described above. This was found to effectively reduce the vaporization rate during the flow periods and to have no effect between flow periods. The result is to achieve lower velocity, longer duration flow pulses and stable operation over a wider range of heating rates.

The bubble generator shown in the various embodiments demonstrates a method to maintain a liquid/vapor interface in a fixed location for the regular and controlled generation of vapor bubbles in a volume of saturated or slightly superheated liquid. The bubble generator, when used in a geyser pumped system, can be given an extended range of stable operation by placing a flow constriction downstream of the bubble generator (i.e., above the bubble generator) in the working fluid. Also when the bubble generator is used in a geyser pumped system, addition of a check valve upstream of the bubble generator can force the bubble expansion forces to move liquid only in the desired direction. As an alternative, the latter two features may be produced by combining the flow constriction and the check valve.

Thus there has been disclosed a unique enhanced geyser pump system which may be used in solar heating systems or in any system where such pumping of liquid is desirable.

This invention is not to be limited by the embodiments shown in the drawings and described in the description, which are given by way of example and not of limitation, but only within the scope of the appended claims.

What is claimed is:

1. A geyser pump system comprising:
   a riser tube having upper and lower ends;
   means for heating said riser tube;
   a liquid medium column filling said tube to near said upper end;
   bubble generating means in said riser tube below the liquid level of said liquid medium near said upper end for generating vapor bubbles when said riser tube is heated;
   said bubble generating means comprising cavity forming means for forming a cavity to isolate a volume of said liquid medium;
   said cavity forming means having at least one aperature in communication with the bulk of said liquid medium for generating vapor bubbles when said isolated volume of liquid in said cavity is heated;
   whereby a temperature rise in said isolated volume of liquid causes formation of bubbles at said at least one aperature.

2. A self pumping heat transfer system comprising:
   a heat collector assembly including a lower inlet manifold, an upper outlet manifold, at least one riser tube for absorbing heat connected in communication with said inlet and outlet manifolds, a liquid medium column filling said at least one riser tube, said outlet manifold receiving liquid and vapor from said at least one riser tube and separating same by gravity;
   bubble generating means positioned in said at least one riser tube below the liquid level of said liquid medium column;
   said bubble generating means comprising cavity forming means for forming a cavity to isolate a volume of said liquid medium;
   said cavity forming means having at least one aperture in communication with the bulk of said liquid medium for generating vapor bubbles when said isolated volume of liquid in said cavity is heated;
   a vapor condenser vessel disposed adjacent said outlet manifold, vapor passageways communicating between said outlet manifold and said vapor condenser so that said outlet manifold is maintained at a pressure conducive to geyser pumping action;
   a cooled liquid providing a liquid surface upon which vapor in said outlet manifold condenses, and combines therewith;
   a supply conduit passing downwardly from said condenser vessel to carry said combined cooled liquid and said condensate to said inlet manifold;
   said liquid medium column substantially occupying the system components at operating temperatures, with the exception of said outlet manifold and a portion of said vapor condensing vessel which contain fluid vapor, said liquid medium being pumped throughout the system by geyser pumping action of said bubble generating means and gravity imbalances.

3. The system according to claim 1 or 2 including means maintaining said volume of liquid in said cavity forming means in good thermal communication with said means for heating said riser tube.

4. The system according to claim 3 in which said means for maintaining said volume of liquid in good thermal communication with said means for heating said riser tube comprises; means maintaining said cavity forming means in good thermal contact with the surface of said riser tube.

5. The systems according to claim 3 in which there are a plurality of said apertures in said cavity forming means, a portion of said apertures being liquid outlets while the remaining are vapor bubble generating sites.

6. The systems according to claim 3 in which said cavity forming means comprises a small section of tube bent into a U-shape and inserted in said riser tube.

7. The systems according to claim 3 in which said cavity forming means is a cylinder inserted in said riser tube having flanges sealingly abutting the inside surface of said riser tube thereby closing off and isolating a volume of said fluid between said riser tube and the inside of surface of said cylinder.

8. The systems according to claim 3 including directional flow restriction means in said riser tube upstream from said bubble generating means.

9. The systems according to claim 3 including flow constricting means downstream of the bubble generating means to control and moderate peak flow rates.

10. The systems according to claims 1 including directional flow restriction means in said riser tube upstream from said bubble generating means.

11. The systems according to claim 8 in which said flow restricting means is a check valve.

12. The systems according to claim 11 in which said check valve is formed as a part of said bubble generating means.

13. The systems according to claim 1 including flow constricting means downstream of the bubble generating means to control and moderate peak flow rates.

14. The systems according to claim 2 including directional flow restriction means in said riser tube upstream from said bubble generating means.

15. The systems according to claim 14 in which said flow restricting means is a check valve.

16. The systems according to claim 15 in which said check valve is formed as a part of said bubble generating means.

17. The systems according to claim 2 including flow constricting means downstream of the bubble generating means to control and moderate peak flow rates.

* * * * *